United States Patent [19]

McIntee et al.

[11] Patent Number: 5,943,414
[45] Date of Patent: Aug. 24, 1999

[54] TRANSPARENT PROTECTED ACCESS TO CORPORATE DIALING PLAN

[75] Inventors: Mark J. McIntee, Chapel Hill; Richard Johnson, Wake Forest, both of N.C.; Patrick O'Shaughnessey, New York, N.Y.; Ted Lowery, Wake Forest, N.C.

[73] Assignee: Northern Telecom Limited, Canada

[21] Appl. No.: 08/903,441

[22] Filed: Jul. 30, 1997

[51] Int. Cl.⁶ .................................................. H04M 3/42
[52] U.S. Cl. .................. 379/220; 379/93.02; 379/93.03; 379/142; 379/196
[58] Field of Search .................................... 379/188, 196, 379/197, 198, 93.02, 93.03, 93.04, 219, 220, 221, 207, 142

[56] References Cited

U.S. PATENT DOCUMENTS

| | | | |
|---|---|---|---|
| 4,661,974 | 4/1987 | Bales et al. | 379/198 |
| 5,003,595 | 3/1991 | Collins et al. | 379/198 |
| 5,524,146 | 6/1996 | Morrisey et al. | 379/88.25 |
| 5,550,904 | 8/1996 | Andruska et al. | 379/198 |
| 5,606,604 | 2/1997 | Rosenblatt et al. | 379/198 |
| 5,737,701 | 4/1998 | Rosenthal et al. | 379/199 |
| 5,822,416 | 10/1998 | Goodacre et al. | 379/198 |

*Primary Examiner*—Scott Wolinsky
*Attorney, Agent, or Firm*—Finnegan, Henderson, Farabow, Garrett & Dunner, L.L.P.

[57] ABSTRACT

A system facilitates use of a corporate dialing plan by authorized remote callers. The system includes a receiving element, a sending element, a detecting element, and an establishing element. The receiving element receives a telephone call signal and a telephone number from a remote caller indicating a desire to use the corporate dialing plan for placing a telephone call to a called party using the telephone number. The sending element sends a telephone calling signal to the called party at the telephone number using the corporate dialing plan. The detecting element detects an answer signal from the called party in response to the sending element sending the telephone calling signal. The establishing element establishes a connection between the remote caller and the called party when the detecting element detects the answer signal.

33 Claims, 15 Drawing Sheets

5,943,414

TRANSPARENT PROTECTED ACCESS TO CORPORATE DIALING PLAN

FIELD OF THE INVENTION

The present invention relates generally to a call management system and more particularly to a system that permits authorized callers outside a corporate network to place telephone calls using the corporate dialing plan.

BACKGROUND OF THE INVENTION

Many corporations have their own internal corporate telephone network with their own dialing plan. The use of the corporate telephone network is essential for the day-to-day work of the corporations' employees. Because of the trend toward employees working offsite, either at home or on the road to customers, a need has developed for these employees to have access to the corporate network from their offsite location. Two conventional approaches have attempted to address this need.

One conventional approach installs a special dedicated telephone line from a fixed location, such as the employee's house, through the public telephone network to the corporate network. There are several problems with such an approach: (1) the high cost of running dedicated telephone lines for each employee working outside the corporate network; (2) the long period of time required to set up the dedicated telephone lines; and (3) the inflexibility of the dedicated telephone lines since they are installed to run to fixed locations.

Another conventional approach requires the employee to use a special calling card. This approach also has several problems: (1) inconvenience due to the long series of digits that normally must be entered to complete a telephone call; (2) expense due to carrier charges incurred for each telephone call; and (3) lack of security because the calling card can be used by anyone, including unauthorized individuals.

An additional problem with both conventional approaches is that the caller's calling identification (ID) is not displayed to the person being called. Corporate networks frequently include special telephones installed to display the caller's calling ID, but these telephones are not presented with the caller's calling ID with either of the above approaches, and recognize the call as merely from an external party.

Therefore, a need exists for providing authorized callers, including employees, external to the corporate network use of the corporate dialing plan in placing telephone calls in a manner that is secure, cost efficient, and easy to use.

SUMMARY OF THE INVENTION

A system consistent with the principles of the present invention that meets this need permits authorized callers external to the corporate network easy access to the corporate dialing plan when placing telephone calls without requiring dedicated telephone lines or special calling cards.

In accordance with the purpose of the invention as embodied and broadly described herein, the system consistent with the principles of the present invention facilitates use of the corporate dialing plan by authorized remote callers. The system includes a receiving element, a sending element, a detecting element, and an establishing element. The receiving element receives a telephone call signal and a telephone number from the remote caller indicating a desire to use the corporate dialing plan for placing a telephone call to a called party using the telephone number. The sending element sends a telephone calling signal to the called party at the telephone number using the corporate dialing plan. The detecting element detects an answer signal from the called party in response to the sending element sending the telephone calling signal. The establishing element establishes a connection between the remote caller and the called party when the detecting element detects the answer signal.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers identify the same or similar elements.

The description includes exemplary embodiments, other embodiments are possible, and changes may be made to the embodiments described without departing from the spirit and scope of the invention. The following detailed description does not limit the invention. Instead, the scope of the invention is defined only by the appended claims.

Systems and methods consistent with the principles of the present invention permit easy access to a corporate dialing plan by authorized outside callers.

I. Offsite Caller Calling Onsite Party

A. Network Elements

Figure 1:
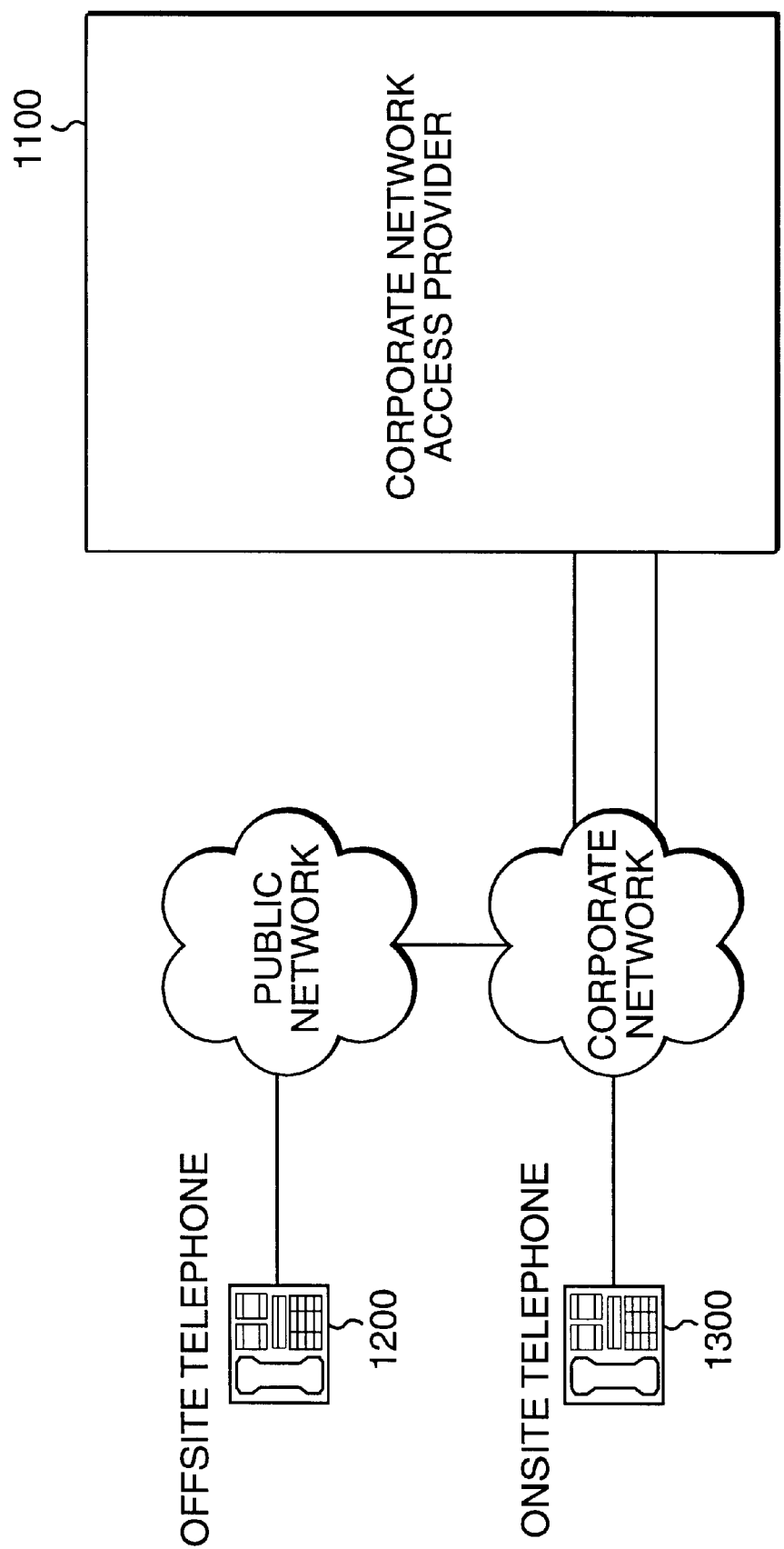
FIG. 1 is a diagram of a communications network consistent with the principles of the present invention.

FIG. 1 is a block diagram of a communications network consistent with the principles of the present invention. Corporate Network Access Provider (CNAP) 1100 regulates access to the corporate dialing plan by an offsite caller desiring to place a telephone call to an onsite party, such as an employee, or an offsite party, such as a client. A single offsite caller and a single onsite party have been shown for simplicity. The present invention does not rely on any specific number of offsite callers and onsite or offsite parties, but encompasses any number of outside callers and onsite or offsite parties.

The offsite caller uses a conventional telephone 1200 to communicate with the onsite party. Telephone 1200 connects to the public network, such as the Public Switched Telephone Network (PSTN), and to a conventional corporate network via the public network, over standard telephone lines.

The onsite party places and receives telephone calls using a conventional telephone 1300. Telephone 1300 connects to the corporate network over standard telephone lines. Telephone 1300 may include a mechanism for displaying a calling ID for an incoming telephone call.

CNAP 1100 is a conventional personal computer, such as an IBM-compatible computer executing Windows NT™ in an implementation consistent with the principles of the present invention. CNAP 1100 connects to the corporate network via Primary Rate Interface 23B+D (PRI) trunks, and regulates access by the offsite caller to the corporate dialing plan over the corporate network. Each of the PRI trunks contains twenty-three voice channels and one control channel, and provides automatic number identification (ANI) capability. CNAP 1100 need not connect to the corporate network using PRI trunks, however, but might alternatively connect to the corporate network using use lines with calling ID capability.

Figure 2:
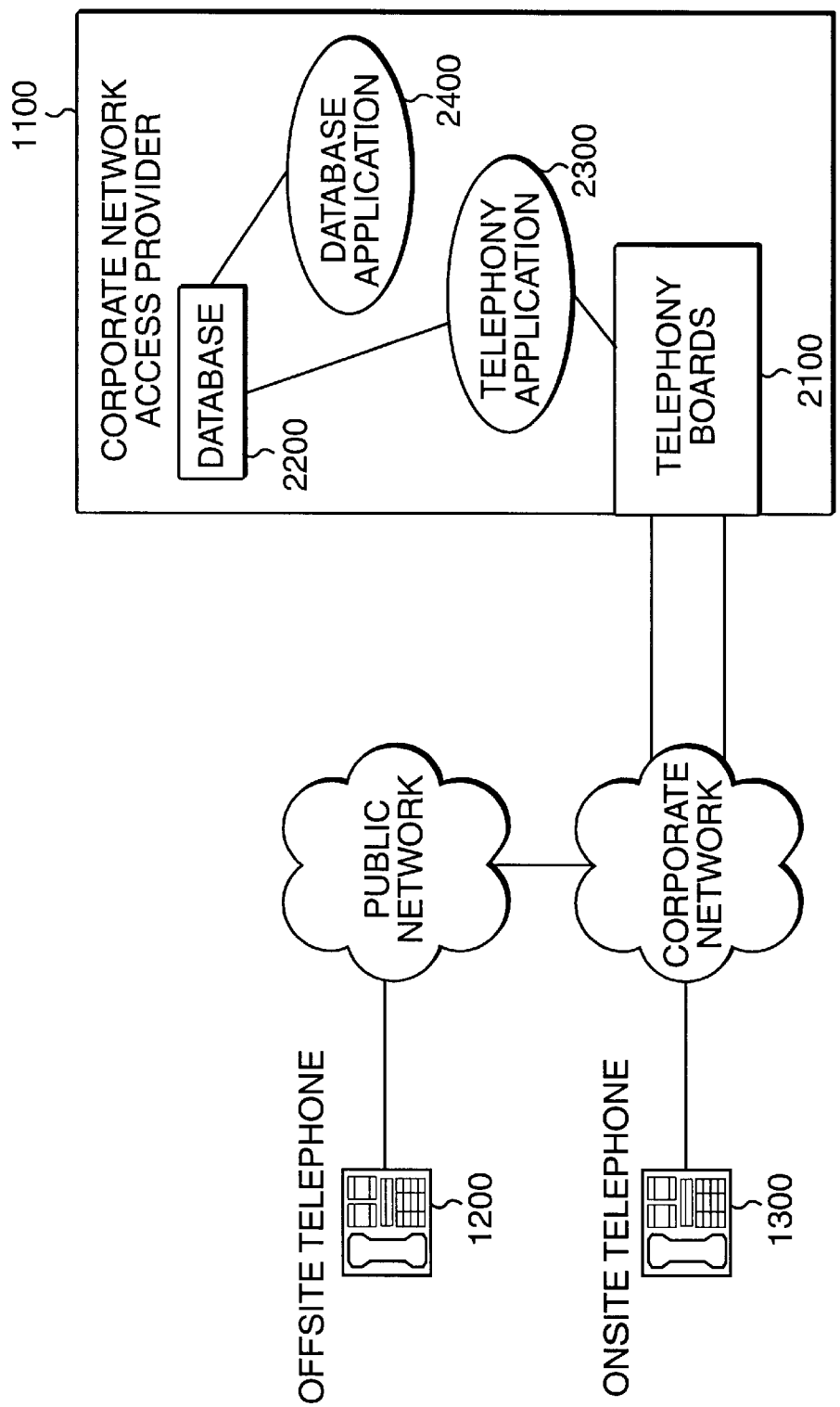
FIG. 2 is a block diagram of the elements of the corporate network access provider of FIG. 1.

FIG. 2 is a block diagram of the elements of CNAP 1100, including telephony boards 2100, database 2200, telephony application 2300, and database application 2400. Telephony boards 2100, in an implementation consistent with the principles of the present invention, are Dialogic D/240SC-T1, or equivalent, telephony boards that provide an interface to the PRI trunks. Telephony boards 2100 supply audible tones over the voice channels of the PRI trunks and detect dual tone multi-frequency (DTMF) tones.

Database 2200 stores valid calling IDs for authorized offsite callers, calling ID information forwarded with an incoming call, and any restrictions on what telephone numbers may be called by an authorized caller. Database 2200 may also store records of each call placed using the corporate dialing plan for auditing purposes.

Telephony application 2300 preferably includes software for controlling telephony boards 2100 and accessing database 2200. Database application 2400 preferably includes software for modifying database 2200 and generating reports.

B. Processing

Figure 3A:
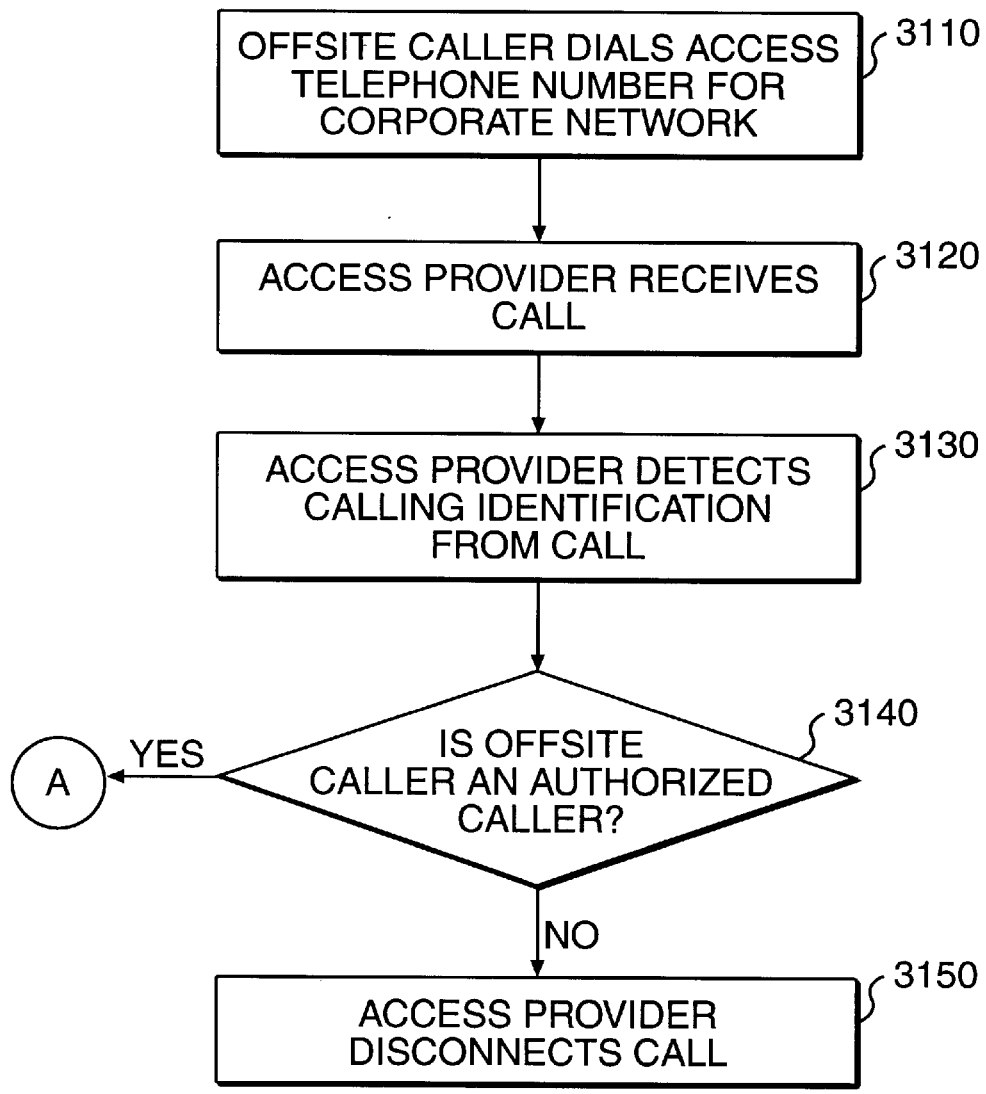
FIGS. 3A–3C are flowcharts illustrating operation of the corporate network access provider consistent with the principles of the present invention when an offsite caller places a telephone call to an onsite party using the corporate dialing plan.
Figure 3B:
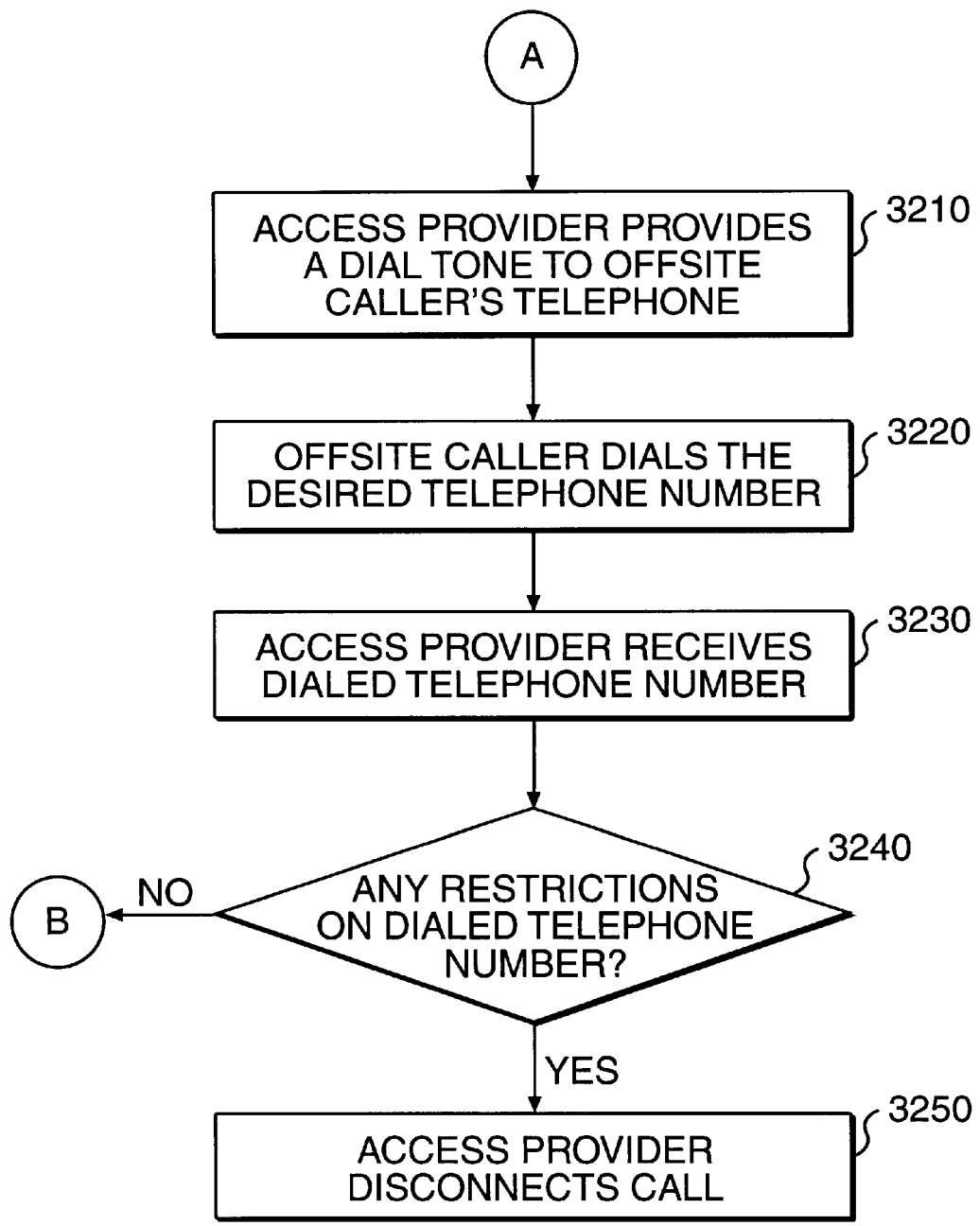
Figure 3C:
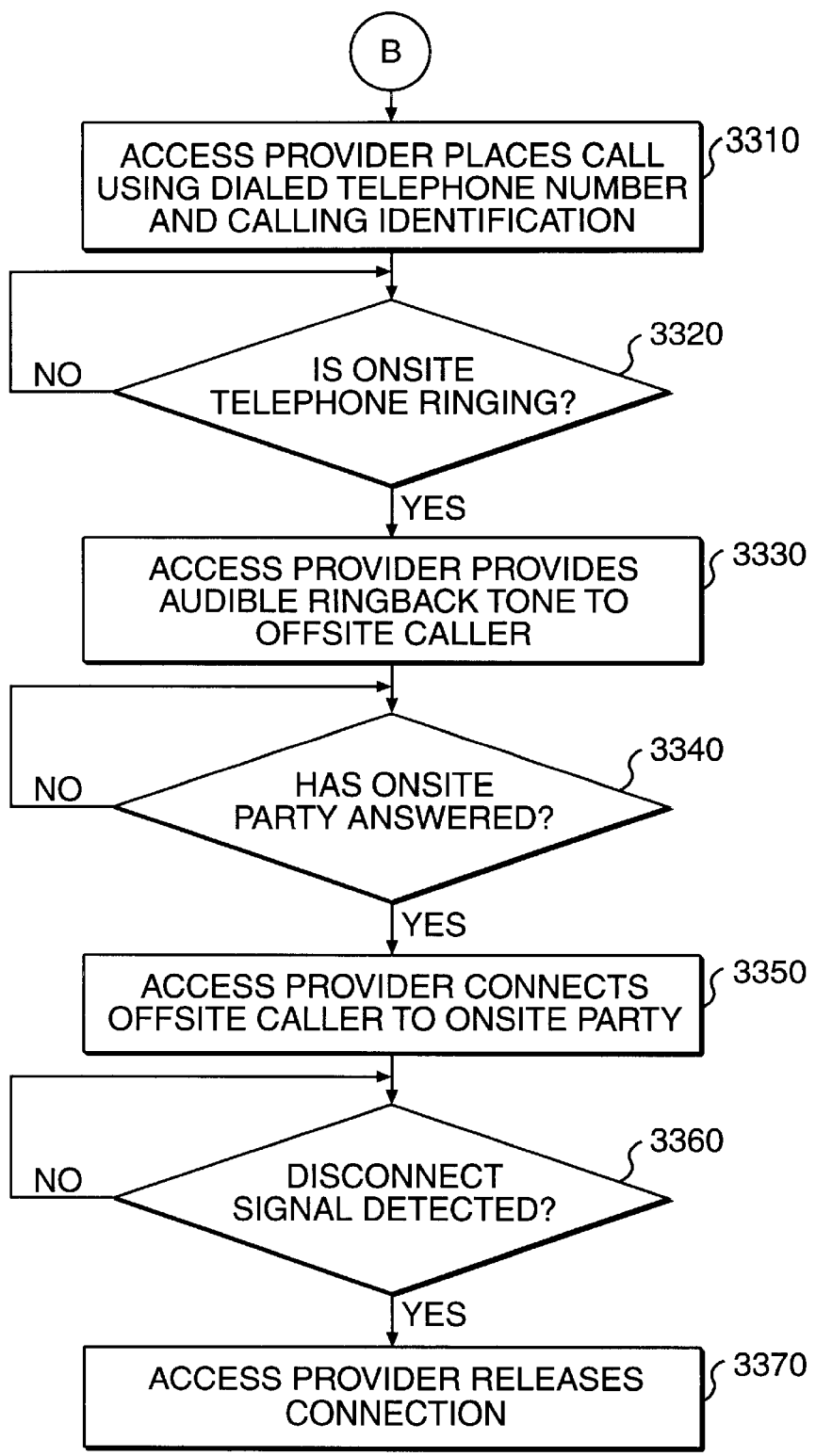
Figure 4A:
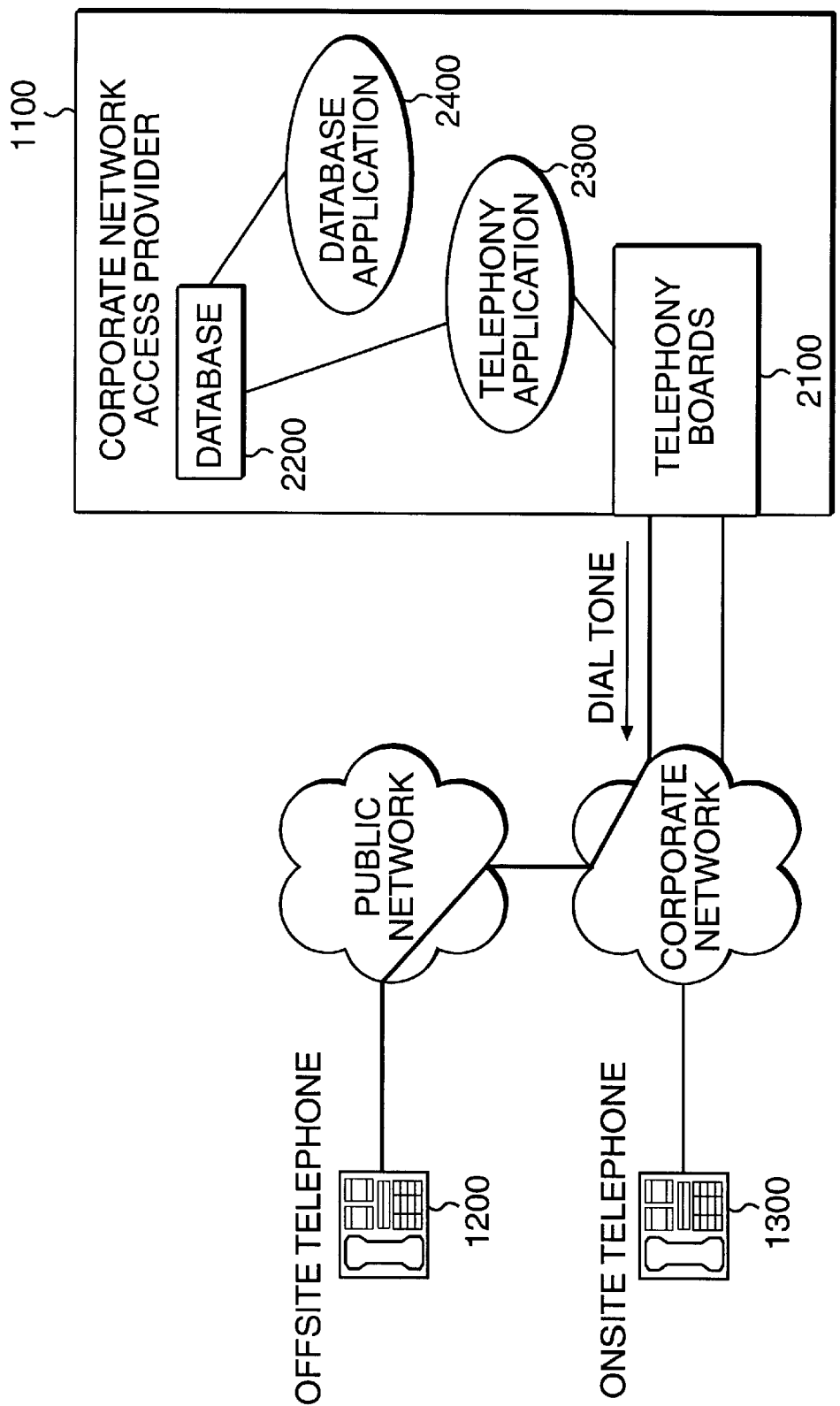
FIGS. 4A–4E are block diagrams of the communications network of FIG. 2, modified to illustrate the operation described in the flowcharts of FIGS. 3A–3C.
Figure 4B:
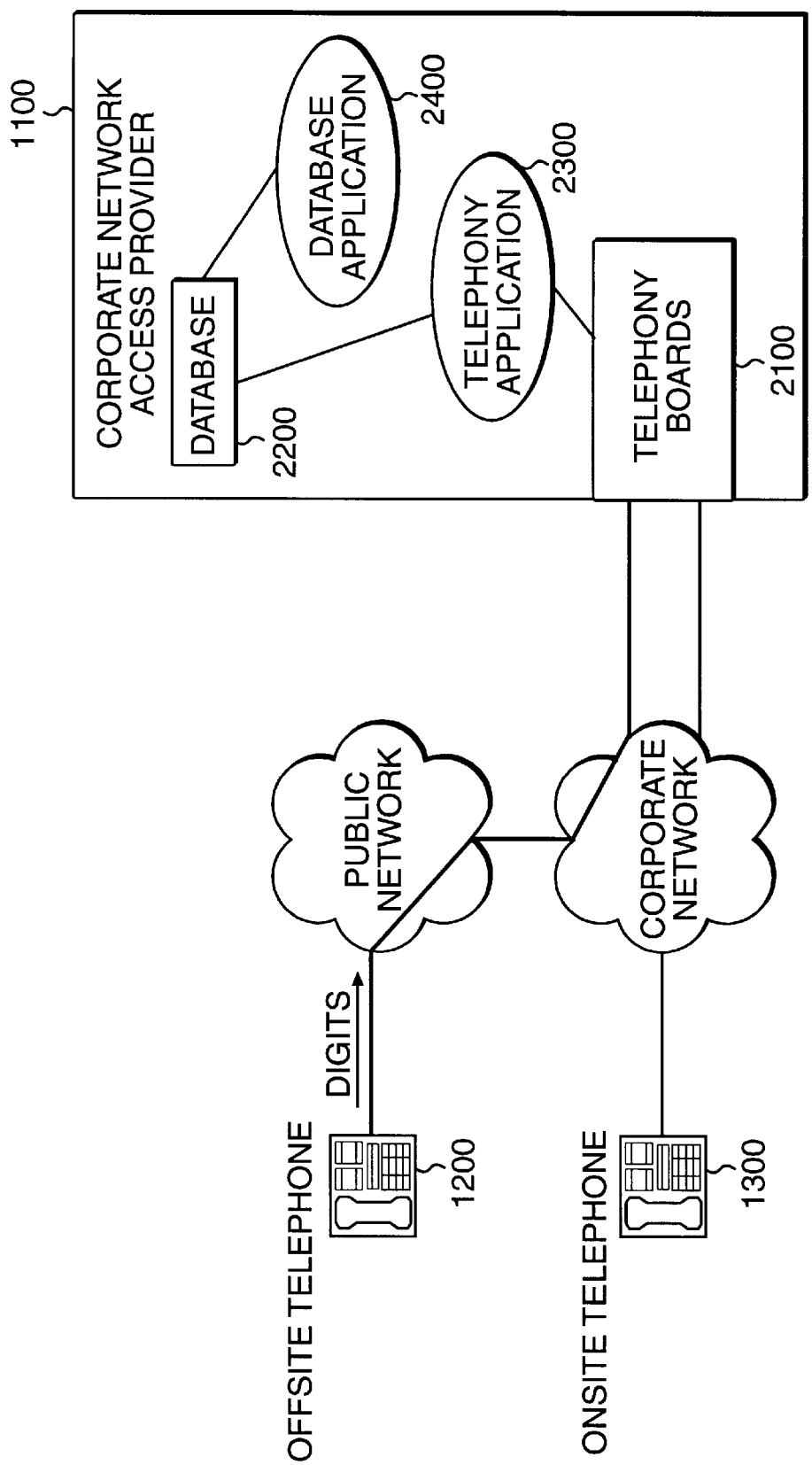
Figure 4C:
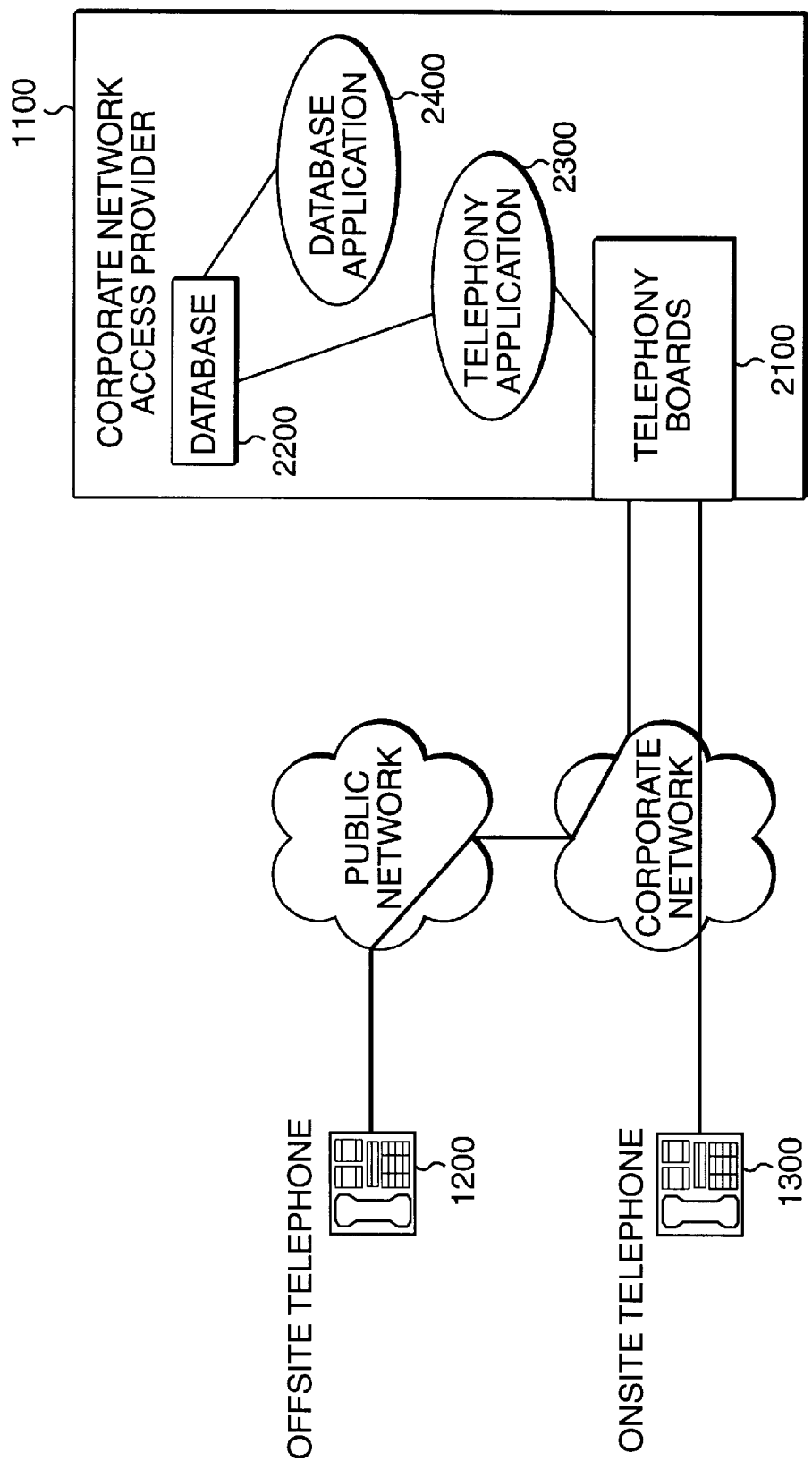
Figure 4D:
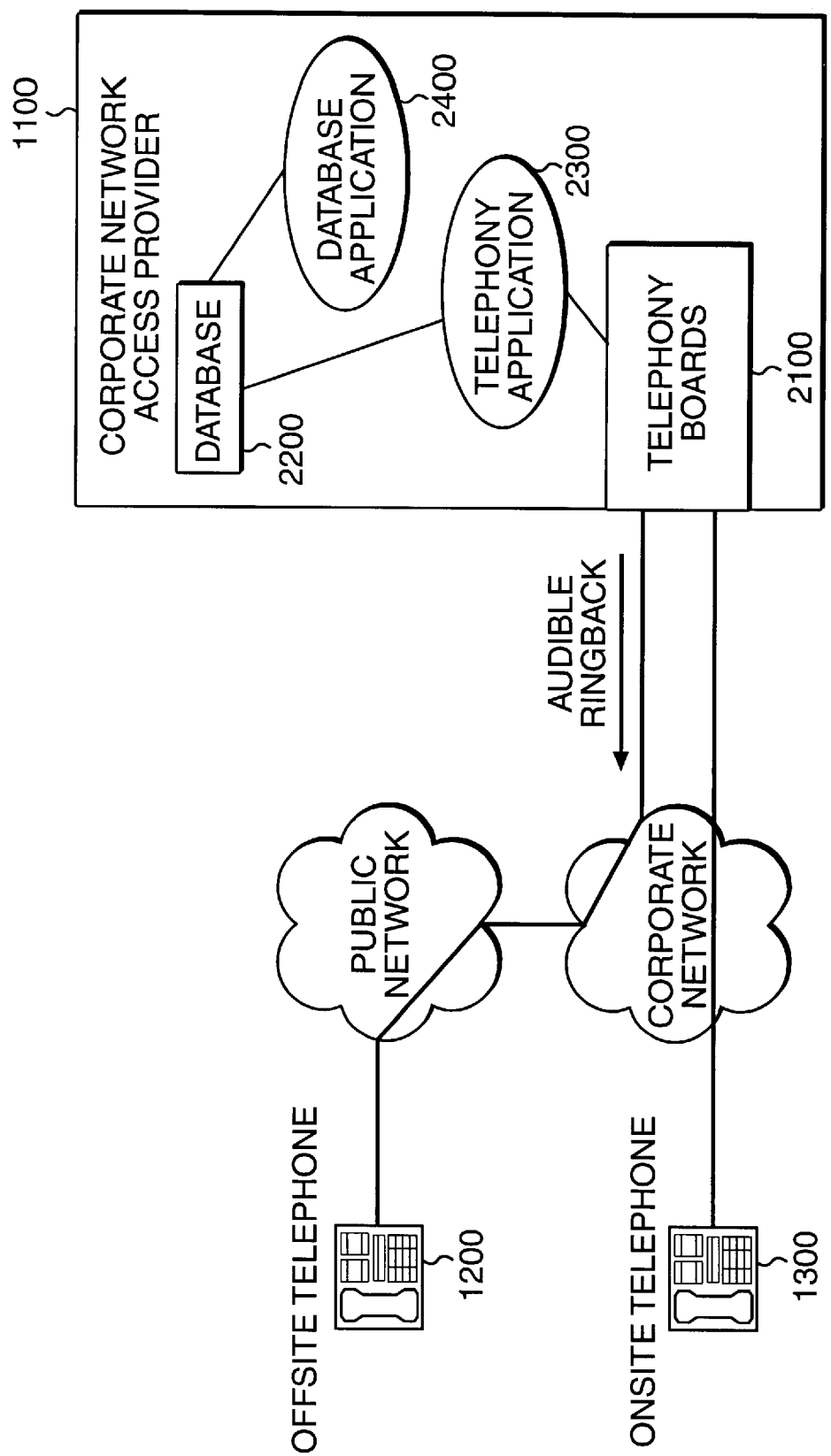
Figure 4E:
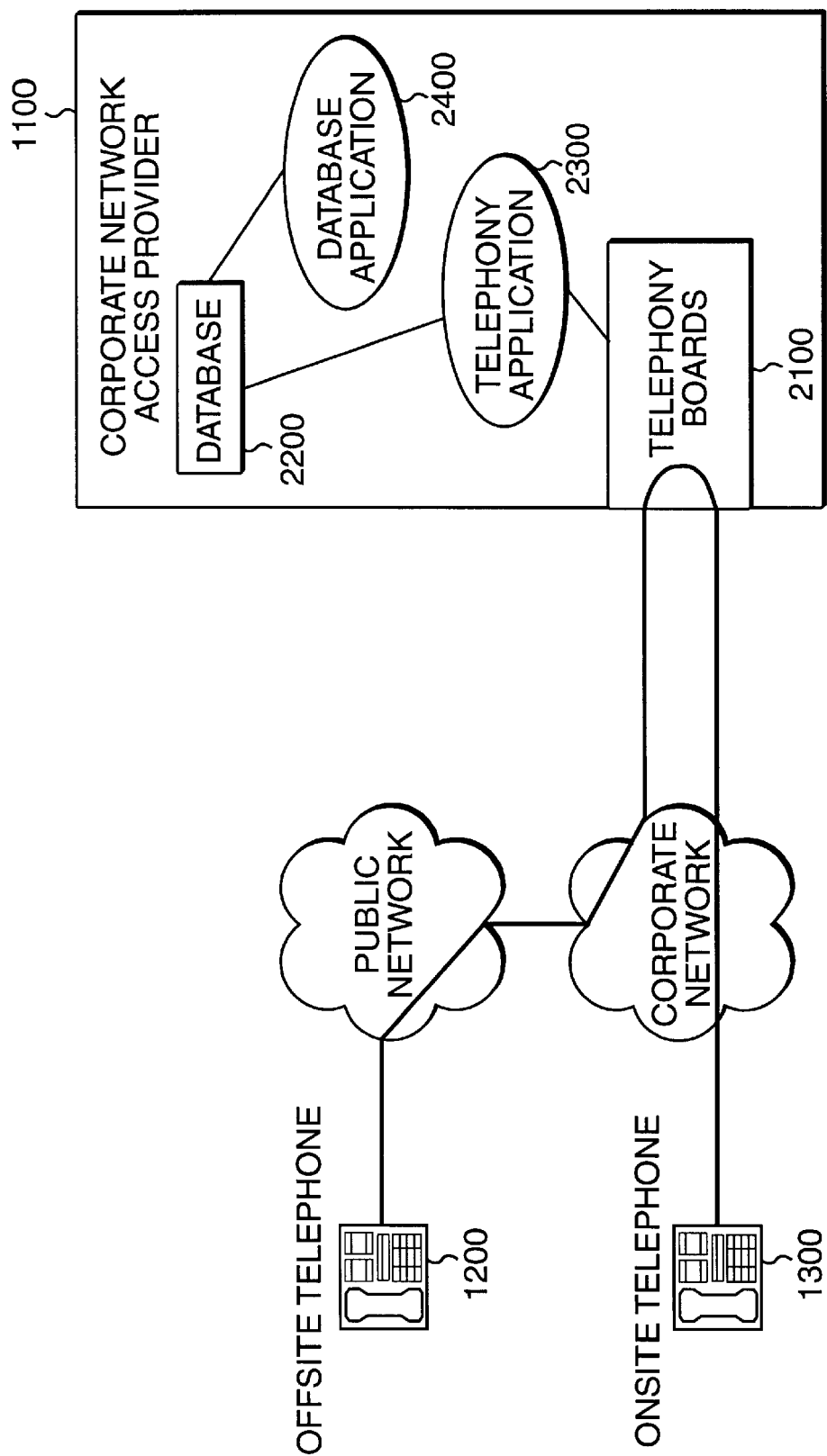

FIGS. 3A–3C are flowcharts illustrating operation of the corporate network access provider consistent with the principles of the present invention when an offsite caller places a telephone call to an onsite party using the corporate dialing plan. FIGS. 4A–4E are block diagrams of the communications network of FIG. 2, modified to illustrate the operation described in the flowcharts of FIGS. 3A–3C.

In FIG. 3A, the operation begins when an offsite caller desires to place a telephone call to an onsite party using the corporate dialing plan. The offsite caller dials the access telephone number for the corporate network [step 3110]. The public network routes the telephone call to the corporate network, which in turn forwards the call to a PRI trunk connected to telephony boards 2100 [step 3120].

Telephony application 2300 detects the offsite caller's calling ID from the received telephone call [step 3130]. Telephony application 2300 then uses the calling ID to access database 2200 to determine whether the offsite caller is an authorized caller [step 3140]. To do this, telephony application 2300 accesses database 2200 to determine whether the offsite caller's calling ID is present in database 2200. If telephony application 2300 cannot locate the offsite caller's calling ID in database 2200, telephony application 2300 concludes that the offsite caller is an unauthorized caller and disconnects the telephone call [step 3150].

If the offsite caller's calling ID is present in database 2200, telephony application 2300 provides a dial tone to offsite telephone 1200 (FIG. 4A) [step 3210]. The dial tone serves as an indication to the offsite caller to dial the telephone number of the onsite party (FIG. 4B) [step 3220]. Telephony application 2300 detects the DTMF tones of the dialed telephone number via the public network and the corporate network [step 3230].

Upon detecting the DTMF tones, telephony application 2300 determines whether there are any restrictions on the dialed telephone number [step 3240]. Telephony application 2300 makes this determination by accessing database 2200 to determine whether the dialed telephone number falls into a class of telephone numbers that is restricted. A restricted telephone number includes, for example, a telephone number for a destination outside the United States, outside a certain area code, or outside the corporate network.

If telephony application 2300 determines that the dialed telephone number is a restricted telephone number, telephony application 2300 informs the offsite caller and disconnects the telephone call [step 3250]. Telephony application 2300 might inform the offsite caller of a dialed restricted telephone number by merely transmitting a series of audible tones or by more complicated methods.

If, on the other hand, telephony application 2300 determines that the dialed telephone number is not restricted, telephony application 2300 secures an idle PRI trunk and places a telephone call to the onsite party using the dialed telephone number and transmitting the offsite caller's calling ID (FIG. 4C) [step 3310]. Telephony application 2300 then creates a new call record including information regarding the starting and ending times of the call, the calling ID, and the dialed telephone number.

Telephony application 2300 monitors the progress of the placed telephone call to determine when the call transitions to a state indicating that onsite telephone 1300 is ringing [step 3320]. Telephony application 2300 makes this determination by receiving a message on the PRI trunk. When onsite telephone 1300 rings, telephony application 2300 provides an audible ringback tone to offsite telephone 1200 (FIG. 4D) [step 3330].

If PRI trunks are not used, however, telephony application 2300 may detect the ringing state through notification from equipment installed on the telephone line to detect the ringing tone, or may wait a predetermined amount of time and assume the ringing state has occurred. Alternatively, telephony application 2300 may not detect the ringing state at all, but may simply connect offsite telephone 1200 and onsite telephone 1300 together to filter the ringing tone from onsite telephone 1300 to offsite telephone 1200.

Once telephony application 2300 notifies the offsite caller of the ringing state, telephony application 2300 then resumes monitoring the progress of the placed call to detect the presence of an answer signal indicating that the onsite party has answered the telephone call [step 3340]. Once telephony application 2300 detects the answer signal, telephony application 2300 removes the audible ringback tone and connects offsite telephone 1200 to onsite telephone 1300 (FIG. 4E) [step 3350].

Telephony application 2300 continues to monitor the progress of the call to detect the presence of a disconnect signal indicating that either the offsite caller or the onsite party has placed telephone 1200 or 1300, respectively, on hook [step 3360]. When telephony application 2300 detects the disconnect signal, telephony application 2300 releases the connection between offsite telephone 1200 and onsite telephone 1300, releases the secured PRI trunks, and updates the new call record [step 3370].

II. Offsite Caller Calling Offsite Party

Figure 5:
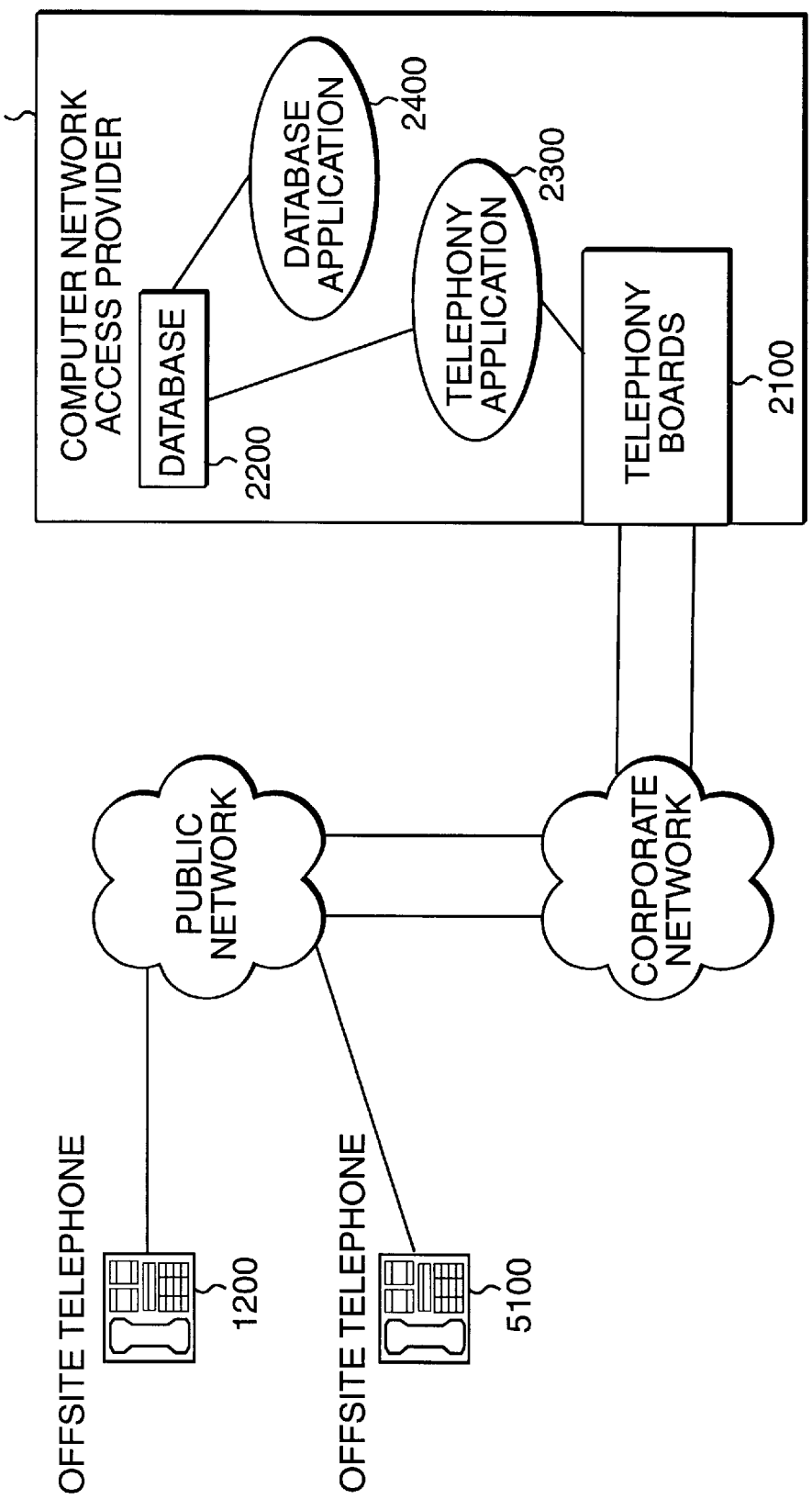
FIG. 5 is a block diagram of the communications network of FIG. 2 in the situation where the offsite caller places a telephone call to an offsite party using the corporate dialing plan in an implementation consistent with the principles of the present invention.

FIG. 5 is a block diagram of the communications network of FIG. 2 in a situation where the offsite caller places a telephone call to an offsite party using the corporate dialing plan in an implementation consistent with the principles of the present invention. The offsite party uses conventional telephone 5100 to receive and transmit telephone calls. Offsite telephone 5100 connects to the public network over standard telephone lines.

Figure 6A:
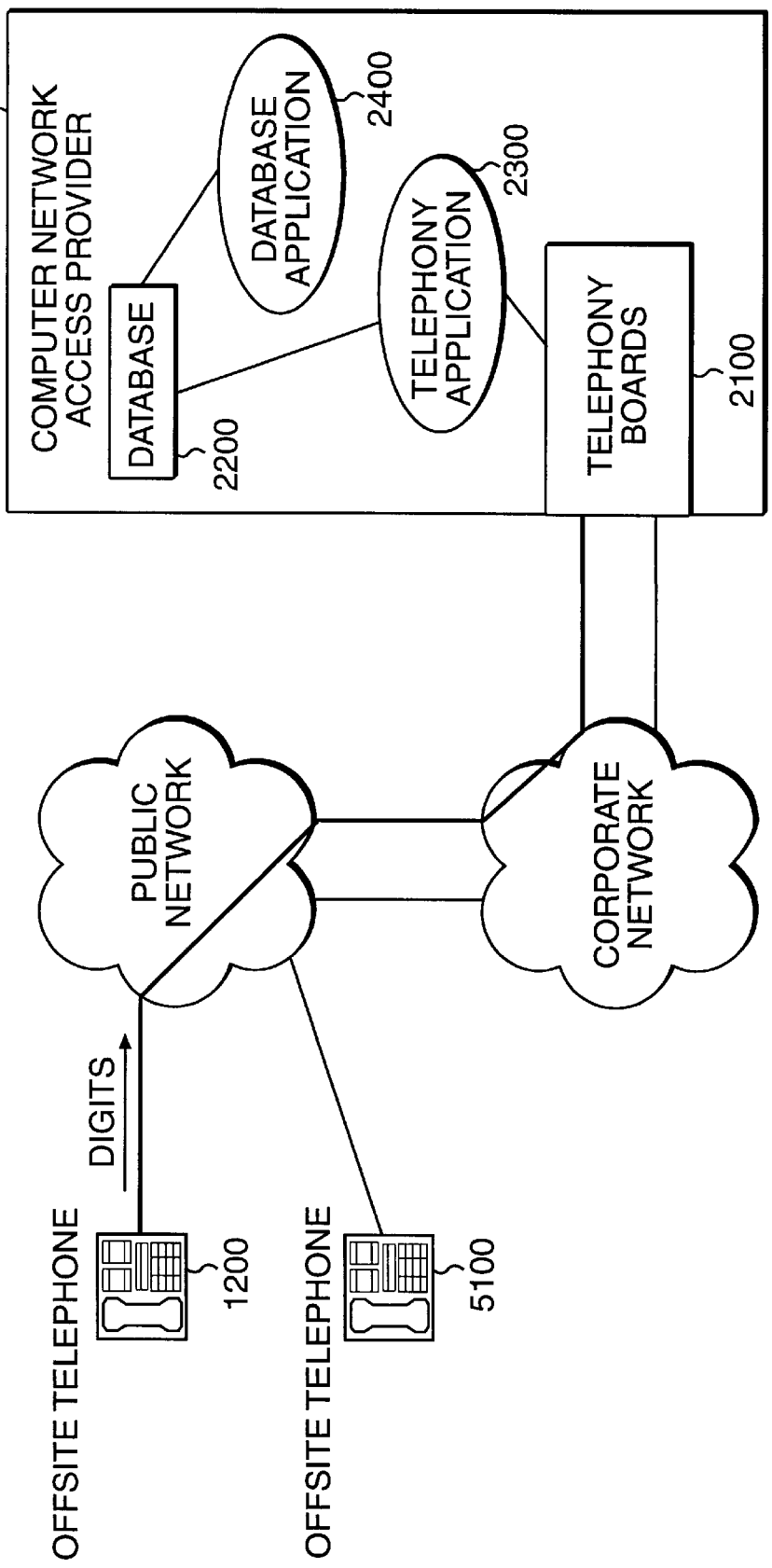
FIGS. 6A–6D are block diagrams of the communications network of FIG. 5, modified to illustrate the operation when the offsite caller places a telephone call to an offsite party.
Figure 6B:
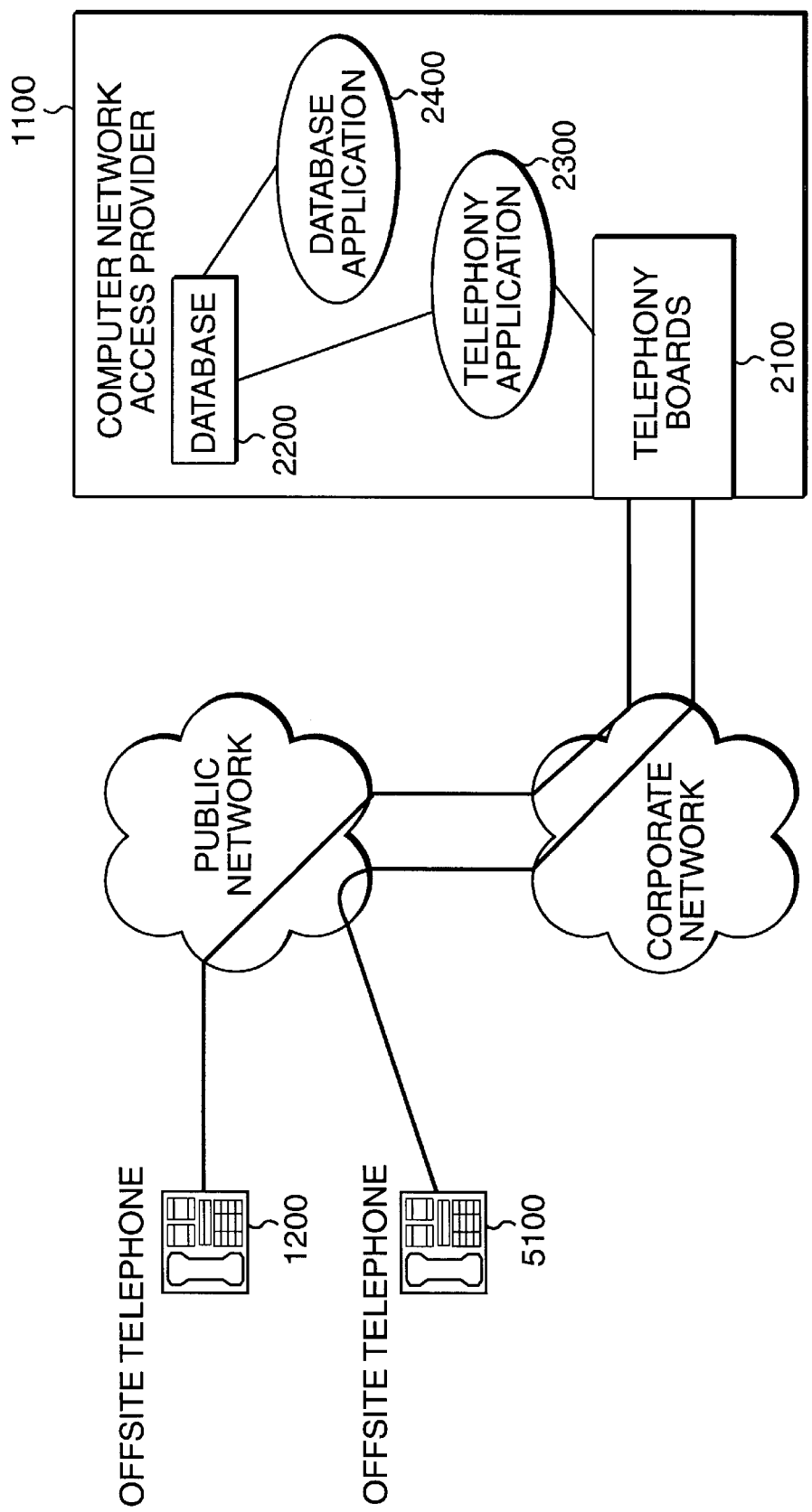

FIGS. 6A–6D are block diagrams of the communications network of FIG. 5, modified to illustrate the operation when the offsite caller places a telephone call to an offsite party using the corporate dialing plan. The operation of CNAP 1100 in this situation is similar to the operation already described with reference to FIGS. 3A–3C. The main difference in this situation is that telephony application 2300, in response to the offsite caller dialing the telephone number of offsite telephone 5100 (FIG. 6A), secures an idle PRI trunk and places a telephone call to the offsite party via the corporate network and the public network, using the dialed telephone number and transmitting the offsite caller's calling ID (FIG. 6B).

Figure 6C:
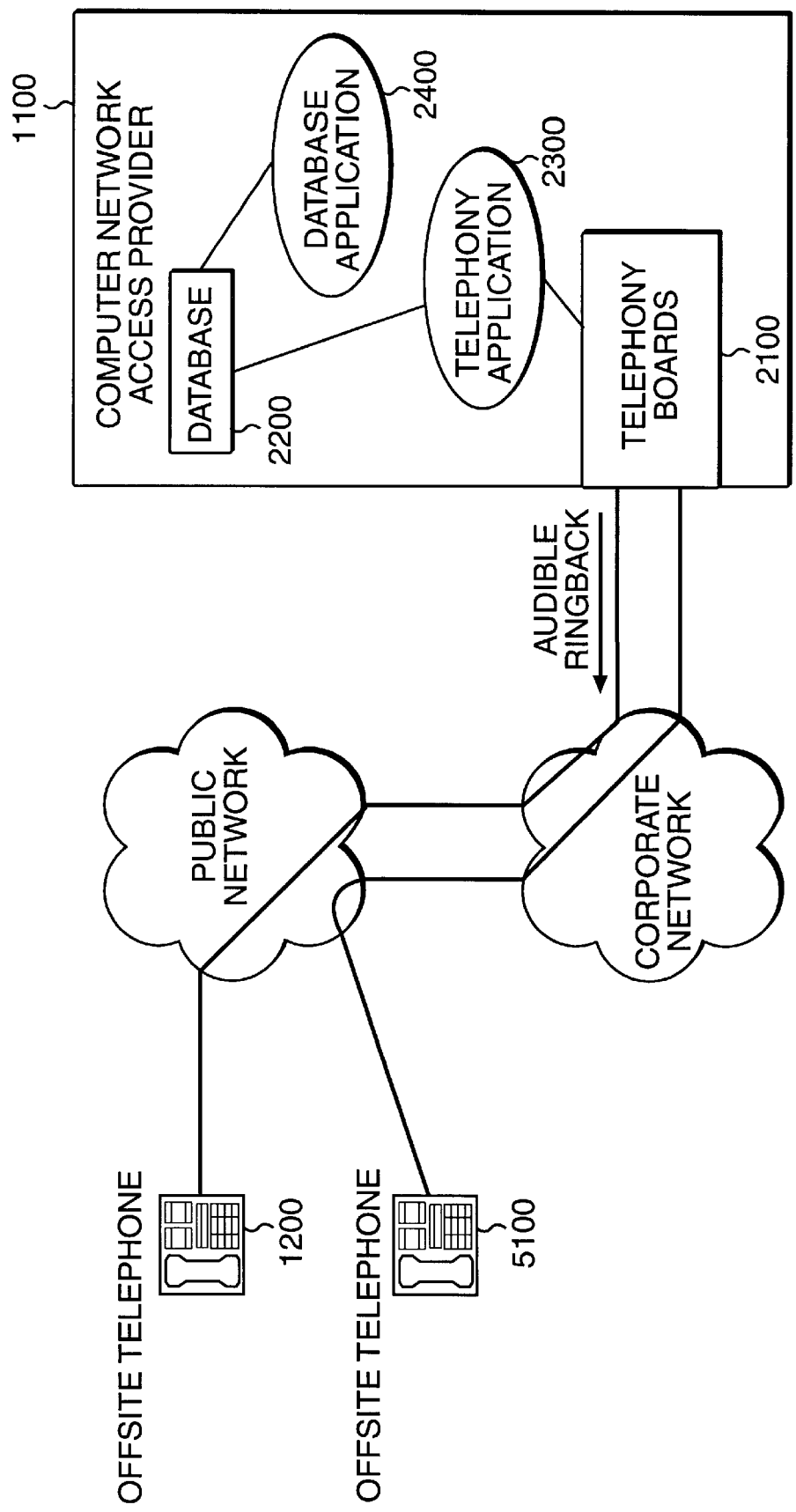
Figure 6D:
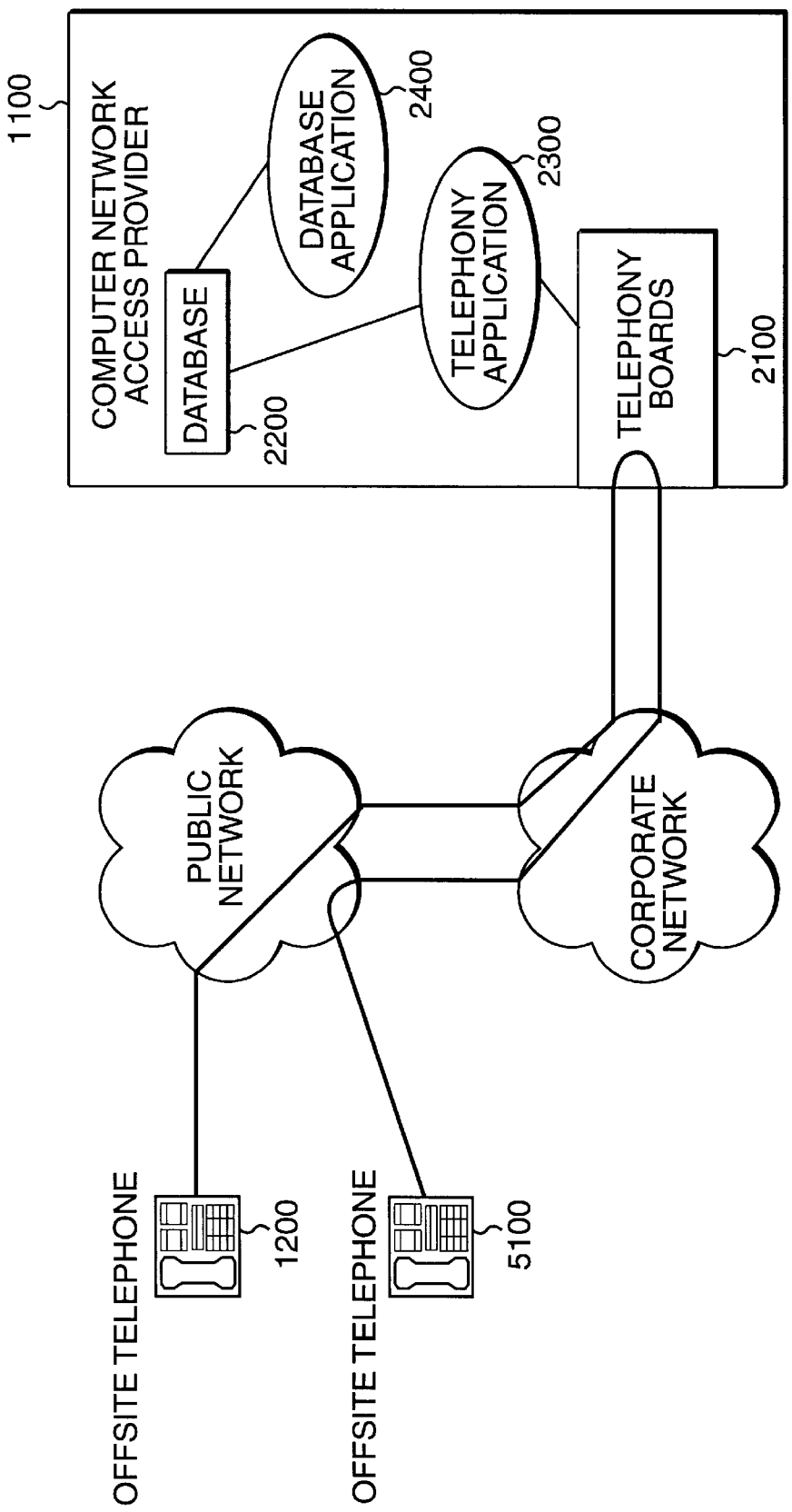

Telephony application 2300 monitors the progress of the placed telephone call and provides an audible ringback tone to the offsite caller when telephony application 2300 detects that offsite telephone 5100 is ringing (FIG. 6C). Telephony application 2300 continues to monitor the status of the placed telephone call to detect whether the offsite party answers the telephone call. When telephony application 2300 detects an answer signal, telephony application 2300 connects offsite telephone 1200 to offsite telephone 5100 (FIG. 6D). Telephony application 2300 releases the connection upon detecting a disconnect signal from either of the parties.

III. Conclusion

The systems and methods consistent with the principles of the present invention permit authorized callers easy access and use of the corporate dialing plan when placing permitted telephone calls.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the telephony boards have been described as Dialogic D/240SC-T1 telephony boards. However, this need not be the case. Other manufacturer's telephony boards, such as those manufactured by Rhetorix, Pika Technologies, and Dianatel, can be used to provide an interface to the PRI trunks, provide a dial tone and audible ringback, and make a connection between calling and called parties.

In addition, the corporate network access provider has been described as an IBM-compatible computer executing Windows NT™, but the present invention is not limited to IBM-compatible computers or computers executing Windows NT™. Other types of computers and operating systems may be substituted without substantially changing the operation of the invention.

What is claimed is:

1. An apparatus for permitting an offsite remote caller to use a corporate dialing plan when placing a telephone call from outside a corporate network, comprising:

means for receiving via the corporate network a telephone call signal from the remote caller indicating a desire to use the corporate dialing plan for placing a telephone call to an onsite or offsite called party via the corporate network;

means for determining whether the remote caller is authorized to use the corporate dialing plan;

means for prompting the remote caller to enter a telephone number corresponding to the called party after the determining means determines that the remote caller is authorized;

means for sending a telephone calling signal to the called party at the telephone number using the corporate dialing plan;

means for detecting an answer signal from the called party in response to the sending means sending the telephone calling signal; and means for establishing a connection between the remote caller and the called party when the detecting means detects the answer signal.

2. The apparatus of claim 1, wherein the determining means includes memory means for storing valid caller identification numbers;

means for detecting a caller identification in the telephone call signal from the remote caller; and means for determining whether the detected caller identification is one of the valid caller identification numbers stored in the memory means.

3. The apparatus of claim 2, wherein the prompting means includes means for prompting the remote caller to enter the telephone number only after the determining means determines that the detected caller identification is one of the valid caller identification numbers stored in the memory means.

4. The apparatus of claim 2, wherein the sending means includes means for transmitting the detected caller identification to the called party with the telephone calling signal.

5. The apparatus of claim 1, further comprising means for storing restrictions on telephone numbers that may be called by the remote caller; and means for determining, based on the restrictions stored in the storing means, whether the telephone number is a permitted telephone number.

6. The apparatus of claim 5, wherein the sending means includes means for sending the telephone calling signal to the called party only after the determining means determines that the telephone number is a permitted telephone number.

7. The apparatus of claim 1, further comprising means for detecting a ringing signal from the called party in response to the ending means sending the telephone calling signal;

means for generating a ringback tone based on the detected ringing signal; and means for transmitting the ringback tone to the remote caller to inform the remote caller of the detected ringing signal.

8. The apparatus of claim 1, further comprising means for transmitting a ringback tone to the remote caller a predetermined amount of time after the sending means sends the telephone calling signal to the called party.

9. A method for permitting an off site remote caller to use a corporate dialing plan when placing a telephone call from outside a corporate network, the method comprising the steps of:

receiving via the corporate network a telephone call signal from the remote caller indicating a desire to use the corporate dialing plan for placing a telephone call to an onsite or offsite called party via the corporate network;

determining whether the remote caller is authorized to use the corporate dialing plan;

prompting the remote caller to enter a telephone number corresponding to the called party after determining that the remote caller is authorized;

sending a telephone calling signal to the called party at the telephone number using the corporate dialing plan;

detecting an answer signal from the called party in response to the telephone calling signal; and establishing a connection between the remote caller and the called party when the answer signal is detected.

10. The method of claim 9, wherein the determining step includes the substeps of storing valid caller identification numbers in memory means;

detecting a caller identification in the telephone call signal from the remote caller; and determining whether the detected caller identification is one of the valid caller identification numbers stored in the memory means.

11. The method of claim 10, wherein the prompting step includes the substep of prompting the remote caller to enter the telephone number only after the detected caller identification is determined to be one of the valid caller identification numbers stored in the memory means.

12. The method of claim 10, wherein the sending step includes the substep of transmitting the detected caller identification to the called party with the telephone calling signal.

13. The method of claim 9, further comprising the steps of storing restrictions on telephone numbers that may be called by the remote caller; and determining based on the stored restrictions whether the telephone number is a permitted telephone number.

14. The method of claim 13, wherein the sending step includes the substep of sending the telephone calling signal to the called party only after the telephone number is determined to be a permitted telephone number.

15. The method of claim 9, further comprising the steps of detecting a ringing signal from the called party in response to the sending of the telephone calling signal;

generating a ringback tone based on the detected ringing signal; and transmitting the ringback tone to the remote caller to inform the remote caller of the detected ringing signal.

16. The method of claim 9, further comprising the step of transmitting a ringback tone to the remote caller a predetermined amount of time after the sending of the telephone calling signal to the called party.

17. A system for regulating use of a corporate dialing plan by an offsite remote caller connected to a public network, comprising:

a corporate network connected to the public network; and an access provider, connected to the corporate network, including memory means for storing a database of remote callers authorized to use the corporate dialing plan, means for receiving Via the corporate network a telephone call signal from the remote caller over the public network, indicating a desire to use the corporate dialing plan for placing a telephone call to an onsite or offsite called party via the corporate network, means for judging whether the remote caller is authorized to use the corporate dialing plan, means for prompting the remote caller to enter a telephone number corresponding to the called party after the judging means determines that the remote caller is authorized, and means for sending a telephone calling signal to the called party at the telephone number using the corporate dialing plan to establish a connection between the remote caller and the called party when the remote caller is judged to be one of the authorized remote callers.

18. The system of claim 17, wherein the database of remote callers includes caller identification numbers corresponding to the authorized remote callers; and wherein the judging means includes means for detecting a caller identification in the telephone call signal from the remote caller, and means for determining whether the detected caller identification is one of the caller identification numbers in the database.

19. The system of claim 18, wherein the prompting means includes means for prompting the remote caller to enter the telephone number only after the determining means determines that the detected caller identification is one of the caller identification numbers included in the database.

20. The system of claim 18, wherein the sending means includes means for transmitting the detected caller identification to the called party with the telephone calling signal.

21. The system of claim 17, wherein the memory means includes means for storing restrictions on telephone numbers that may be called by the remote caller; and wherein the access provider further includes means for determining, based on the restrictions stored in the memory means, whether the telephone number is a permitted telephone number.

22. The system of claim 21, wherein the sending means includes means for sending the telephone calling signal to the called party only after the determining means determines that the telephone number is a permitted telephone number.

23. The system of claim 17, wherein the access provider further includes means for detecting a ringing signal from the called party in response to the sending means sending the telephone calling signal, means for generating a ringback tone based on the detected ringing signal, and means for transmitting the ringback tone to the remote caller to inform the remote caller of the detected ringing signal.

24. The system of claim 17, wherein the access provider further includes means for transmitting a ringback tone to the remote caller a predetermined amount of time after the sending means sends the telephone calling signal to the called party.

25. The system of claim 17, wherein the access provider further includes
 means for detecting an answer signal from the called party in response to the telephone calling signal; and
 means for establishing a connection between the remote caller and the called party only when the answer signal is detected.

26. A method for regulating use of a corporate dialing plan by an offsite remote caller connected to a public network, comprising the steps of:
 receiving via a corporate network connected to the public network a telephone call signal from the remote caller indicating a desire to use the corporate dialing plan for placing a telephone call to an onsite or offsite called party via the corporate network;
 determining whether the remote caller is authorized to use the corporate dialing plan;
 prompting the remote caller to enter a telephone number corresponding to the called party after determining that the remote caller is authorized;
 judging whether the telephone number is a permitted telephone number when the remote caller is determined to be authorized; and
 sending a telephone calling signal to the called party at the telephone number using the corporate dialing plan to establish a connection between the remote caller and the called party when the telephone number is judged to be a permitted telephone number.

27. The method of claim 26, further including the step of
 storing caller identification numbers corresponding to authorized remote callers in memory means; and
 wherein the determining step includes the substeps of
  detecting a caller identification in the telephone call signal from the remote caller, and
  determining whether the detected caller identification is one of the caller identification numbers stored in the memory means.

28. The method of claim 27, wherein the prompting step includes the substep of
 prompting the remote caller to enter the telephone number only after the detected caller identification is determined to be one of the caller identification numbers stored in the memory means.

29. The method of claim 27, wherein the sending step includes the substep of
 transmitting the detected caller identification to the called party with the telephone calling signal.

30. The method of claim 26, further comprising the step of
 storing restrictions on telephone numbers that may be called by the remote caller in memory means; and
 wherein the judging step includes the substep of
  determining, based on the restrictions stored in the memory means,
 whether the telephone number is a permitted telephone number.

31. The method of claim 26, further comprising the steps of
 detecting a ringing signal from the called party in response to the sending of the telephone calling signal;
 generating a ringback tone based on the detected ringing signal; and
 transmitting the ringback tone to the remote caller to inform the remote caller of the detected ringing signal.

32. The method of claim 26, further comprising the step of
 transmitting a ringback tone to the remote caller a predetermined amount of time after the sending of the telephone calling signal to the called party.

33. The method of claim 26, further comprising the steps of
 detecting an answer signal from the called party in response to the telephone calling signal; and
 establishing a connection between the remote caller and the called party only when the answer signal is detected.

* * * * *